United States Patent
Van Cleve et al.

(10) Patent No.: US 6,598,489 B1
(45) Date of Patent: Jul. 29, 2003

(54) BALANCE BAR HAVING A REDUCED AXIAL THERMAL STRESS RESULTING FROM HIGH TEMPERATURE MANUFACTURING METHODS

(75) Inventors: Craig Brainerd Van Cleve, Lyons, CO (US); Theodore L. Bertchie, Berthoud, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 10/113,548

(22) Filed: Mar. 29, 2002

(51) Int. Cl.[7] .................................................. G01F 1/78
(52) U.S. Cl. .................................................. 73/861.357
(58) Field of Search ....................... 73/861.351, 861.358, 73/861.354, 861.355, 861.356

(56) References Cited

U.S. PATENT DOCUMENTS

| | | | | |
|---|---|---|---|---|
| 4,781,069 A | * | 11/1988 | Mitzner .................. | 73/861.358 |
| 5,157,975 A | * | 10/1992 | Tanaka et al. ........... | 73/861.38 |
| 5,323,658 A | * | 6/1994 | Yao et al. ............... | 73/861.351 |
| 5,370,002 A | * | 12/1994 | Normen et al. ........ | 73/861.357 |
| 6,360,614 B1 | * | 3/2002 | Drahm et al. .......... | 73/861.357 |
| 6,386,048 B2 | * | 5/2002 | Van Cleve et al. ..... | 73/861.357 |
| 6,415,668 B1 | * | 7/2002 | Cage ...................... | 73/861.355 |

* cited by examiner

*Primary Examiner*—Edward Lefkowitz
*Assistant Examiner*—Charlene Dickens
(74) *Attorney, Agent, or Firm*—Duft Setter Ollila & Bornsen LLC

(57) ABSTRACT

A manufacturing process that prevents stress between a titanium flow tube and a surrounding steel balance bar due to a brazing operation. A straight tube Coriolis flowmeter having a titanium flow tube is surrounded by a balance bar having separate longitudinal halves. The balance bar halves are connected to each other by an elongated side channel on each side of the balance bar halves. The elongated side channels are radially spaced apart from the balance bar halves but connected to the balance bar halves by means of tubular pegs which extend into holes in the side channels. The flow tube is joined by brazing via connecting rings to the balance bar halves and to an inner end of the pegs. The radially outer end of the pegs are inserted into the holes in the side channels and welded. Circular welds and slots in the side channels reduce axial shrinkage of the side channels as the welds cool. This prevents axial stress on the flow tube.

17 Claims, 6 Drawing Sheets

BALANCE BAR HAVING A REDUCED AXIAL THERMAL STRESS RESULTING FROM HIGH TEMPERATURE MANUFACTURING METHODS

FIELDS OF THE INVENTION

This invention relates to Coriolis flowmeter and, in particular, to Coriolis flowmeters having a single flow tube connected to a surrounding balance bar. This invention further relates to a straight flow tube Coriolis flowmeter having a balance bar whose design and construction reduce the residual thermal stress on the flow tube due to manufacturing operations involving temperatures exceeding those encountered during normal operating conditions of the flowmeter.

PROBLEM

Coriolis flowmeters having a single straight flow tube surrounded in part by a balance bar are known. The balance bar counterbalances the vibrating flow tube so that the balance bar and flow tube together form a dynamically balanced structure. The outer axial ends of the balance bar are connected by connecting rings to the outer surface of the flow tube. These connections are accomplished by a high temperature bonding operation such as by brazing or soldering.

The thermal stresses and corrosive fluids to which flow tubes are subjected in normal operation require that they be formed of titanium. A titanium flow tube is readily brazed to a titanium balance bar and, since both have the same thermal expansion coefficient, the cooled assembly has very little residual thermal stress. Unfortunately, titanium balance bars are very costly. Balance bars could be made of less expensive steel except for the problem of high temperature brazing. Steel has a thermal expansion coefficient that is close enough to titanium so that under normal flowmeter operating temperatures neither the flow tube nor the balance bar are over-stressed due to differential thermal expansion. However, the high temperature brazing operation used to join the parts (more than 746° Centigrade) expands the steel balance bar significantly more than the titanium flow tube. As these parts begin to cool, the braze material solidifies at a temperature well above the normal operating temperature range of the flowmeter. Continued cooling shrinks the steel balance bar axially more than the titanium flow tube. This differential shrinkage can amount to a strain level of more than 2.3 mm per meter of balance bar length. A shrinkage of this magnitude puts the titanium flow tube in compression with a stress of 0.23 GPa and can impair the performance of the flowmeter or can even exceed the yield strength of the flow tube under certain conditions.

Attempts have been made to overcome the differential thermal expansion/contraction problems associated with the use of a titanium flow tube with a balance bar formed of a different material such as steel. However, these attempts have not been wholly successful and have resulted in the creation of other problems. One such attempt involves the use of a steel balance bar having two half sections joined by bellows as a center portion. This solution is not ideal since bellows are axially symmetric and make difficult the controlling of the vibrational modes of the balance bar. Another solution, is the joining of separate balance bar sections by means of leaf springs. This solution also results in problems in the vibrational characteristics of the balance bar.

It can therefore be seen in view of the above that it is a problem to provide a Coriolis flowmeter having a titanium flow tube and a steel balance bar that are not susceptible to structural damage during the manufacturing operations involving the use of high temperature bonding operations.

SOLUTION

The residual thermal stress problem is solved by separating the balance bar structure into two independent halves. These halves are separated from each other in the central portion so that, in the braze furnace, the balance bar halves can expand and contract without contacting each other and without stressing the flow tube. At this time, the balance bar halves are brazed to the flow tube via connecting rings at their axially outer ends.

A significant aspect of this invention involves the method in which the balance bar halves are connected to each other after the brazing step. This connection is necessary for several reasons. First, it is necessary for the tuning of the modes of vibration of the balance bar-flow tube assembly. This assembly is a distributed mass-stiffness system and therefore has an infinite number of modes of vibration. One of the important modes of vibration is the drive mode in which the flow tube and the balance bar vibrate out-of-phase with each other in the drive plane direction in their first bending modes. There is another vibration mode which looks like the drive mode except that it occurs in a direction perpendicular to the drive mode. This mode is called the lateral mode. If the lateral mode frequency is too near the drive mode frequency, the accuracy of the meter is reduced. The prior art bellows connection means has equal bending stiffnesses in both the drive and lateral directions resulting in nearly equal resonant frequencies. The present invention separates these two frequencies by making the connection means between the two balance bar halves stiffer in bending in the drive direction than in the lateral direction. This raises the drive mode frequency above the lateral mode frequency.

Connecting the two balance bar halves also enables both halves to be driven in the drive mode by a single driver. This is important because two drivers would have to be precisely matched in order to avoid deforming the flow tube in a shape that looks like a response to fluid flow. Such deformation would give erroneous flow readings.

The present invention overcomes the above discussed and other problems resulting from high temperature induced stress on the flow tube during the brazing of the balance bar to the outer walls of the flow tube via connecting rings. This new process includes the steps of providing a balance bar having separate halves; bonding the outer axial ends of the balance bar halves via connecting rings to the outer walls of the flow tube; connecting balance bar halves to each other by side channel members which are positioned parallel to the longitudinal axis of the balance bar halves and are bisected by the neutral surface of the assembly in the drive mode. (The neutral surface in the drive mode is defined as the theoretical surface in a bending member that experiences neither compressive nor tensile stresses. In the single tube flowmeter it is defined by the tube axis and a line intersecting it that extends in the lateral direction.) Furthermore, the side channels are radially spaced apart from the outer surface of the balance bar. The side channels are connected to the balance bar by means of pegs. The pegs are inserted into holes in the channel members and holes in the balance bar halves.

The pair of cylindrical balance bar halves has a combined axial length somewhat less than that of a conventional integral balance bar. The inner axial ends of the balance bar halves are separated a desired amount to form a center section that separates the balance bar halves. The flow tube is inserted within the interior of the balance bar halves. The outer axial ends of the balance bar halves are aligned with a connecting ring having a center opening through which the flow tube is extended. The outer periphery of the connecting ring is then brazed to the axial outer end of each balance bar half and the inner surface of the connecting ring is simultaneously brazed to the outer surface of the flow tube.

During the same brazing operation, the pegs are brazed into holes in the walls of each balance bar half. The hole centers are located on the neutral surface. At this time, the fabrication of the flowmeter has proceeded to the point where the outer ends of the balance bar halves are brazed to the flow tube via the connecting rings and the pegs are brazed into the holes in the balance bar walls.

Following the brazing operation the pegs are inserted into holes in the side channels and welded. Each balance bar half is connected by a welding operation to each side channel using a pair of pegs for each side channel. A greater number of pegs such as, for example, four pegs per channel (two on each end) could also be used. At this point in the fabrication process, the assembly includes a flow tube inserted within the interior of a pair of axially aligned balance bar halves. Connecting rings bond the outer axial ends of each balance bar half to the flow tube walls. Pegs are brazed to holes in the outer walls of the balance bar halves and protrude outward from the balance bar walls radially. Two side channels are positioned onto the pegs on the opposite sides of the balance bar halves and are welded to the pegs.

The pegs are used as intermediate parts between the balance bar halves and the side channels for three reasons. First, welding the channels directly to the balance bar halves would produce welds that would be long and parallel to the meter axis. This would produce a great amount of heat, shrinkage, and ultimately residual tube stress. Second, the stress in these welds due to the drive vibration would be greatest at the ends of the welds adjacent to the gap between the balance bar ends. The ends of welds also are the sites of the highest welding stress. Superimposing the cyclic vibration stresses of normal operation onto the high weld stress at the weld ends would almost certainly result in fatigue cracking. Finally, it is difficult to make full penetration welds in the long fillet welds between the side rails and the balance bar halves. It is important that the welds between the balance bar halves and the side channels achieve full penetration into the side channels so there is no possibility of a rubbing friction between the balance bar halves and the channels. Any such rubbing friction impairs the stability of the output data of the resultant Coriolis flowmeter.

Pegs avoid these problems. The welds are small and localized and thus put very little heat into the side rails or the balance bar halves. This results in less axial shrinkage of the side rails. The side channels are radially spaced away from the balance bar halves so that the only contacts with the balance bar halves are via the pegs. The end of the peg is easily given a chamfer to allow a full penetration weld and eliminate rubbing friction in these welds. Also, the weld of the peg to the side channel is circular and has no high weld stress location like the linear weld. Finally, the cyclic vibration stress applied to the peg is primarily torsion which is uniformly distributed throughout the weld.

The balance bar halves and the side channels and pegs comprise a rigid, axially elongated member which vibrationally functions in the same manner as an integral balance bar. The balance bar halves connected by the side channels can be vibrated transversely in phase opposition to the flow tube to form a dynamically balanced member having performance characteristics comparable to that of an integral balance bar. Furthermore, the use of the balance bar halves together with the side channels and the pegs eliminate the destructive forces associated with the high temperature brazing of a flow tube made out of a first material, such as titanium, to a balance bar made out of a different material, such as steel.

The affixing of the side channels to the balance bar via pegs and a welding operation is an improvement over the prior art flowmeters which generate undesirable axial stress in the flow tube and/or the balance bar as a result of the single high temperature brazing operation. Welding produces its own shrinkage that slightly shortens the channels and produces tube stress. However, welding heating is fast and localized and thus results in shrinkage and residual tube stress that is factor of ten less than that resulting from furnace brazing. Furthermore, other aspects of the design of the present invention reduce residual tube stress due to the weld shrinkage to an insignificant level.

The present invention permits the cost of a single tube flowmeter to be reduced by permitting a steel balance bar or the like to be used in combination with a titanium flow tube. The advantages of the present invention are achieved by the use of balance bar halves rather than a single integrated balance bar. These advantages are still further achieved by the means of the use of pegs which are brazed to the balance bar and are subsequently welded to the side channels. The side channels are made from readily available stock material such as rolled mild steel channel. The pegs are made from readily available steel tubing.

An aspect of the invention is a Coriolis flow meter adapted to be connected to a system having a material flow, said Coriolis flow meter having a balance bar and a flow tube adapted to be vibrated in a drive plane in phase opposition to generate Coriolis deflections of said vibrating flow tube with material flow; pickoff means that detect said Coriolis deflections to generate signals representing information pertaining to said material flow; said balance bar is coaxial with said flow tube and surrounds a portion of said flow tube, said Coriolis flow meter further comprises:

connecting rings;

separate halves of said balance bar each being coaxial with said flow tube and with each half having an axial outer end connected to a surface of said flow tube by one of said connecting rings;

elongated apparatus that interconnects the inner axial ends of said balance bar halves, said elongated apparatus is located on the neutral plane of the drive mode of said balance bar and is spaced apart from the outer radial surface of said balance bar halves;

said elongated apparatus and said balance bar halves vibrate in said drive plane as an integral structure.

Preferably said elongated apparatus comprises:

a plurality of elongated elements each spaced apart from the outer radial surface of said balance bar halves and oriented parallel to the longitudinal axis of said balance bar halves.

Preferably said elongated elements define side channels that are-u-shaped in a cross section perpendicular to their longitudinal axes.

Preferably said elongated elements define side channels that are non-U-shaped in cross section.

Preferably pegs connect said elongated elements to said balance bar halves;

said pegs and said elongated elements and said balance bar halves vibrate in said drive mode as an integral element.

Preferably said pegs are located in holes in said elongated elements and in said balance bar halves.

Preferably said pegs are bonded at a first end to holes in said balance bar halves and welded at a second end to holes in said elongated elements.

Preferably said pegs are tubular with a hollow center core.

Preferably said pegs are circular in cross section.

Preferably said pegs have an non circular cross section.

Preferably at least one peg connecting each elongated element with each of said balance bar halves.

Preferably at least two pegs connecting each elongated element with each of said balance bar halves.

Preferably said pegs are tubular with each peg each having a first end bonded to one of said balance bar halves and a second end welded to one of said elongated elements.

Preferably said elongated elements have slots oriented transversely to a longitudinal axis of said elongated elements, said slots limit axial shrink of said elongated elements due to the welding of said pegs to said elongated elements.

Preferably said Coriolis flow meter has two elongated elements oriented longitudinally on opposite sides of said balance bar.

Preferably said weld defines an endless closed loop.

Preferably said weld defines a circular pattern.

Another aspect of the invention is a method of forming a Coriolis flow meter adapted to be connected to a system having a material flow, said Coriolis flow meter having a balance bar and a flow tube adapted to be vibrated in a drive plane in phase opposition to generate Coriolis deflections of said vibrating flow tube with material flow; pickoff means that detect said Coriolis deflections to generate signals representing information pertaining to said material flow; said balance bar is coaxial with said flow tube and surrounds a portion of said flow tube, said method comprises the steps of:

forming said balance bar to define separate cylindrical balance bar halves;

inserting said flow tube into the axial center of said balance bar halves so that at least a portion of said flow tube is surrounded by said balance bar halves;

bonding an axial outer end of each balance bar half to an outer surface of said flow tube using a connecting ring having a center opening through which said flow tube extends;

positioning elongated apparatus on the neutral plane of the drive mode of said balance bar halves and spaced apart from the outer radial surface of said balance bar halves; and connecting said elongated apparatus to said balance bar halves so that said elongated apparatus and said balance bar halves vibrate as an integral unit when said flow tube and said balance bar halves are vibrated in said drive mode.

Preferably said elongated apparatus defines a plurality of elongated elongated elements and said method includes the further steps of:

positioning said elongated elements on opposite sides of said balance bar halves; and connecting said elongated elements to said balance bar halves via said pegs.

Preferably said step of connecting said elongated elements to said balance bar halves includes the steps of:

forming holes in said outer surface of said balance bar halves;

forming matching holes in said elongated elements;

brazing a first end of tubular pegs to said holes in said balance bar halves;

inserting a second end of said pegs into said matching holes of said elongated elements; and welding said second end of said pegs to said elongated elements.

Preferably said step of welding includes the step of forming said weld to define a circular pattern.

Preferably forming tubular pegs with each peg each having a first end bonded to one of said balance bar halves and a second end bonded to one of said elongated elements.

Preferably forming the walls of said elongated elements with slots oriented transversely to a longitudinal axis of said elongated elements to limit axial shrink of said elongated elements due to said step of welding.

Preferably forming said elongated elements to define elongated side channels that are-U-shaped in a cross section perpendicular to their longitudinal axes.

Preferably forming said elongated elements to define elongated side channels that are non-U-shaped.

Preferably connecting at least two pegs connecting each elongated element with each of said balance bar halves.

Preferably forming said Coriolis flow meter so that said pegs are circular in cross section.

Preferably forming said Coriolis flow meter so that said pegs have a non circular cross section.

Preferably forming said Coriolis flow meter so that there is at least one peg connecting each elongated element with each of said balance bar halves.

DESCRIPTION OF THE DRAWINGS

The above and other advantages and features of the invention can be understood from a reading of the following detailed description taken in conjunction with the drawings in which.

DETAILED DESCRIPTION

Figure 1:
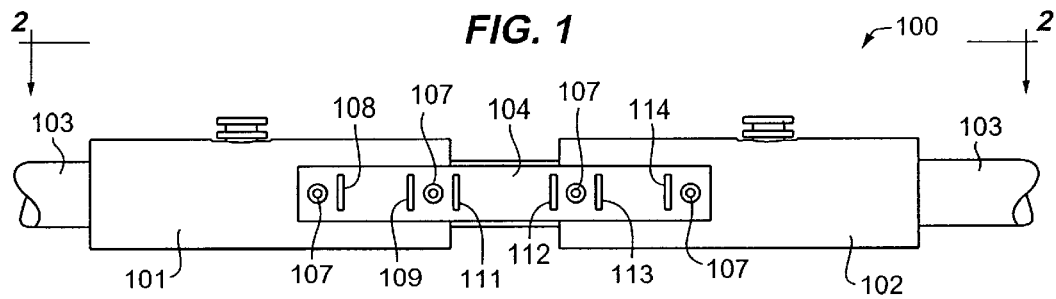
FIG. 1 is a side view of a flow tube and balance bar assembly of the present invention.
Figure 2:
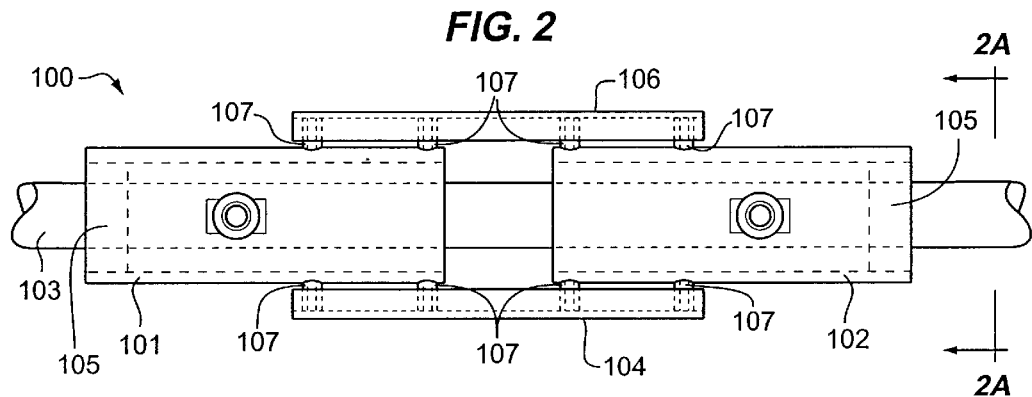
FIG. 2 is a top view of the apparatus of FIG. 1.
Figure 2A:
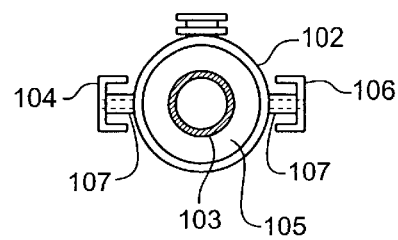
FIG. 2A is an end view of the apparatus of FIG. 1.

Description of FIGS. 1, 2, and 2A

FIGS. 1 and 2 disclose the invention as comprising a flow tube 103 positioned within and surrounded by balance bar halves 101 and 102. Also shown are side channels 104 and 106 and pegs 107 which connect side channels 104 and 106 to balance bar halves 101 and 102. Pegs 107 are shown as tubular elements with a hollow axial center. FIGS. 1 and 2 also disclose slots 108, 109 and 111–114 which lessen the axial weld shrinkage in the side channels and thus reduce the residual thermal stress within the balance bar halves and flow tube.

Balance bar halves 101 and 102 are interconnected by side channels 104 and 106 and pegs 107. Pegs 107 are formed of standard mild steel tubing which is brazed into holes in the balance bar halves at the same time the outer ends of the balance bar halves are brazed to flow tube 103 via connecting ring 105. After brazing, the outer radial ends of the pegs 107 are inserted into holes in side channels 104 and 106. Pegs 107 are then welded to side channels 104,106. Side channels 104,106 are also stock items made from rolled mild steel. The side channels are radially spaced apart from the balance bar halves so that the only contacts between the side channels and the balance bar halves are via the pegs 107. It is important that the weld between the pegs and the side channels achieve full penetration so that there is no possibility of rubbing friction between the side channels and the pegs. Rubbing friction is undesired and can impair the zero stability of the completed Coriolis flowmeter.

FIG. 2A is a cross-sectional end view of the structure of FIG. 2. The outer axial end of balance bar half 102 is bonded to flow tube 103 by connecting ring 105. Pegs 107 are brazed to balance bar half 102 and the outer radial ends of the pegs 107 are inserted into openings in side channels 104 and 106 and welded. The dashed lines inside pegs 107 indicate that pegs are hollow, tubular elements. FIG. 2A shows side channels 104 and 106 as U-shaped.

Figure 3:
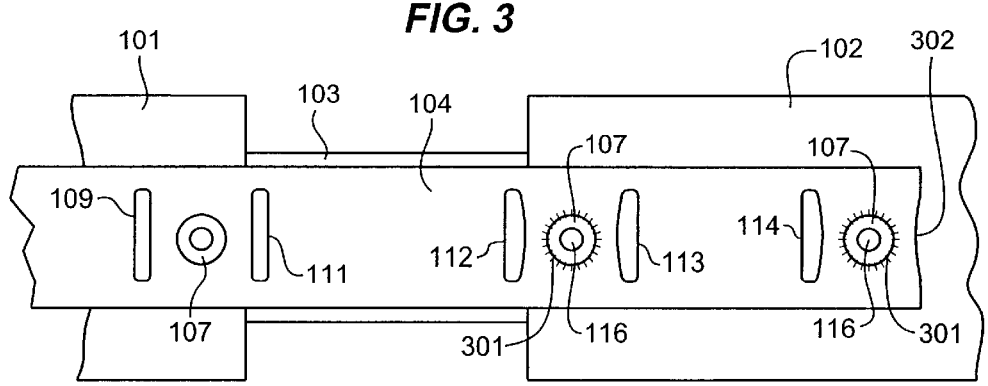
FIG. 3 discloses further details of the side channels and the pegs.

Description of FIG. 3

FIG. 3 shows the detail of the rightmost two welds 301 affixing pegs 107 to the right half of side channel 104. Each weld 301 is circular so it has no end at which to concentrate stress. This makes it less likely to crack when in use. Two features of welds 301 reduce the weld stress. The first is the center hole 116 in each peg 107. As a weld 301 cools and shrinks after welding, it pulls the peg wall outwardly toward weld 301 and hole 116 of a peg 107 increases in diameter. This increase in the hole size has no effect on the overall channel dimensions or the hole spacing. With a solid center for peg 107, the metal of side channel 104 would be pulled further inwardly toward the weld as the weld 301 cools and shrinks after welding. This would cause the side channel to shorten and place the balance bar halves in tension. Flow tube 103 would then be in compression due to the connection between the balance bar halves and the flow tube provided by connecting ring 105. Shortening of the side channels 104 and 106 and the resultant stress on the flow tube is also reduced by the stress relief slots 108, 109 and 111–114. These slots allow the metal of the side channels 104 and 106 between the slot 113 and weld 301 to be pulled toward the welds so that the slots get wider rather than the side channel getting shorter as the welds shrink in diameter as they cool. This is shown for slots 113 and 114. Slots 109 and 111 are not wider since their peg 107 is not yet welded. The slots further reduce the weld stress in addition to reducing the overall axial shrinkage of the side channels. Also the cooling of weld 301 of the rightmost peg 107 shrinks the material of the right end of side channel 104 to produce the indentation 302 in the end of the side channel.

Other shapes of the material forming the pegs 107 and the side channels 104 and 106 could be used. However, stock structural shapes are desirable because of their low cost and ready availability. A solid rectangular bar or an I-beam could be used instead of a U-shaped channel 104 and 106. Both come in a variety of depth to width ratios which facilitates the frequency separation between the drive and lateral modes. Other shapes besides round tubing could also be used for the pegs. However, a drawback would be the added cost of the required machining of openings in the side channels and balance bar halves.

It is also possible to use fewer or a greater number of pegs than the number shown on the drawings. One peg on each end of each side channel has the advantage that the load on the peg is nearly entirely of the torsion or twist type. This puts the stress for the entire peg at the same level. Unfortunately, that stress level is higher than the two pegs per end version because the peg diameter for a single peg has to be greater to provide the same stiffness per peg. It is also possible to use more than two pegs per side channel end. However, the use of more than two pegs is pointless since the center pegs on each balance bar half would take very little of the load.

There are a number of key features to the present invention. The first feature is the use of side channels to provide the required coupling between the balance bar halves. The second is the use pegs to provide clearance between the balance bar halves and the side channels to eliminate any rubbing friction. The provision of endless welds 301 connecting the pegs 107 to side channels 104 and 106 reduces the risk of fatigue cracking. The stress relief provided by the slots and the hollow pegs minimizes any weld induced shrinkage of the side channels. Finally, full penetration welds eliminate any potential rubbing between pegs 107 and the side channels 104 and 102.

The present invention significantly reduces the stress on the various components of a flowmeter. A flowmeter having a titanium flow tube and an integral steel balance bar would have a differential rate of thermal expansion that could destroy the flow tube and/or the balance bar. The strain generated by the temperatures associated with a brazing operation would be in the magnitude 2.25 mm per meter of balance bar length. This invention discloses the use of separate balance bar halves 101 and 102 rather than a single integrated balance bar. The provision of separate balance bar halves, side channels and pegs of the present invention reduces the strain to a magnitude of approximately 0.45 mm per meter. The use of the circular welds and the slots reduces further the thermal contraction of the length of the side channels. This reduces the residual thermal strain in the flow tube to a magnitude of approximately 0.22 mm per meter. This strain is one tenth that produced by the prior art practice. The forces and stresses on the flowmeter components resulting from this low level of differential expansion can be accommodated by other flowmeter design techniques and by data compensation operations of meter electronics element 820 of FIG. 8.

Figure 4:
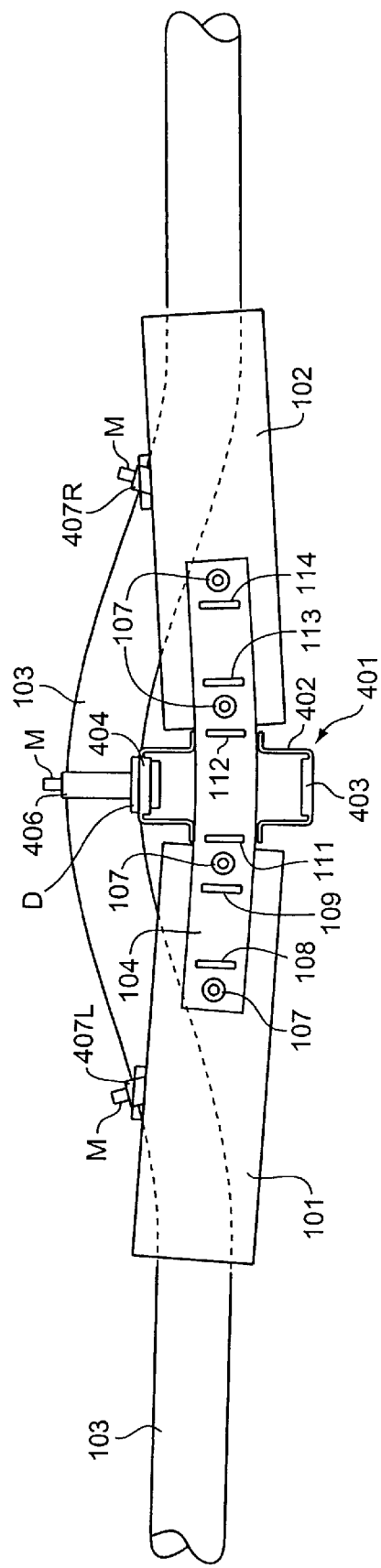
FIGS. 4–7 disclose further details of a partially completed assembly as well as operational vibrational patterns.

Description of FIG. 4

FIG. 4 discloses the apparatus of FIGS. 1–3 as well as additional structure embodying an operational Coriolis flowmeter. The apparatus is shown deflected in the drive mode of vibration. The amplitude of deflection is greatly exaggerated for clarity. Part numbers on FIG. 4 are designated identically where the numbers represent identical structure on both FIGS. 1–3 and FIG. 4. The additional structure shown on FIG. 4 comprises the drive apparatus shown between the inner ends of balance bar halves 101 and 102. This structure comprises a lower counterweight drive bracket 401 having a lower portion 403 and side walls 402. A counterweight that would be fastened to 403 is not shown. Upper drive bracket 404 mounts a drive coil D which interacts with magnet M to vibrate flow tube 103 and balance bar halves 102 and 101 in phase opposition. Brackets 403 and 404 are affixed to the side channels 104 and 106. Since the side channels are firmly affixed to balance bar halves 101 and 102, the balance bar halves and side channels function as an integral balance bar in response to the forces generated by driver D. Ring 406 comprises a structure which, as shown better on FIG. 8, affixes a magnet M flow tube 103.

Figure 8:
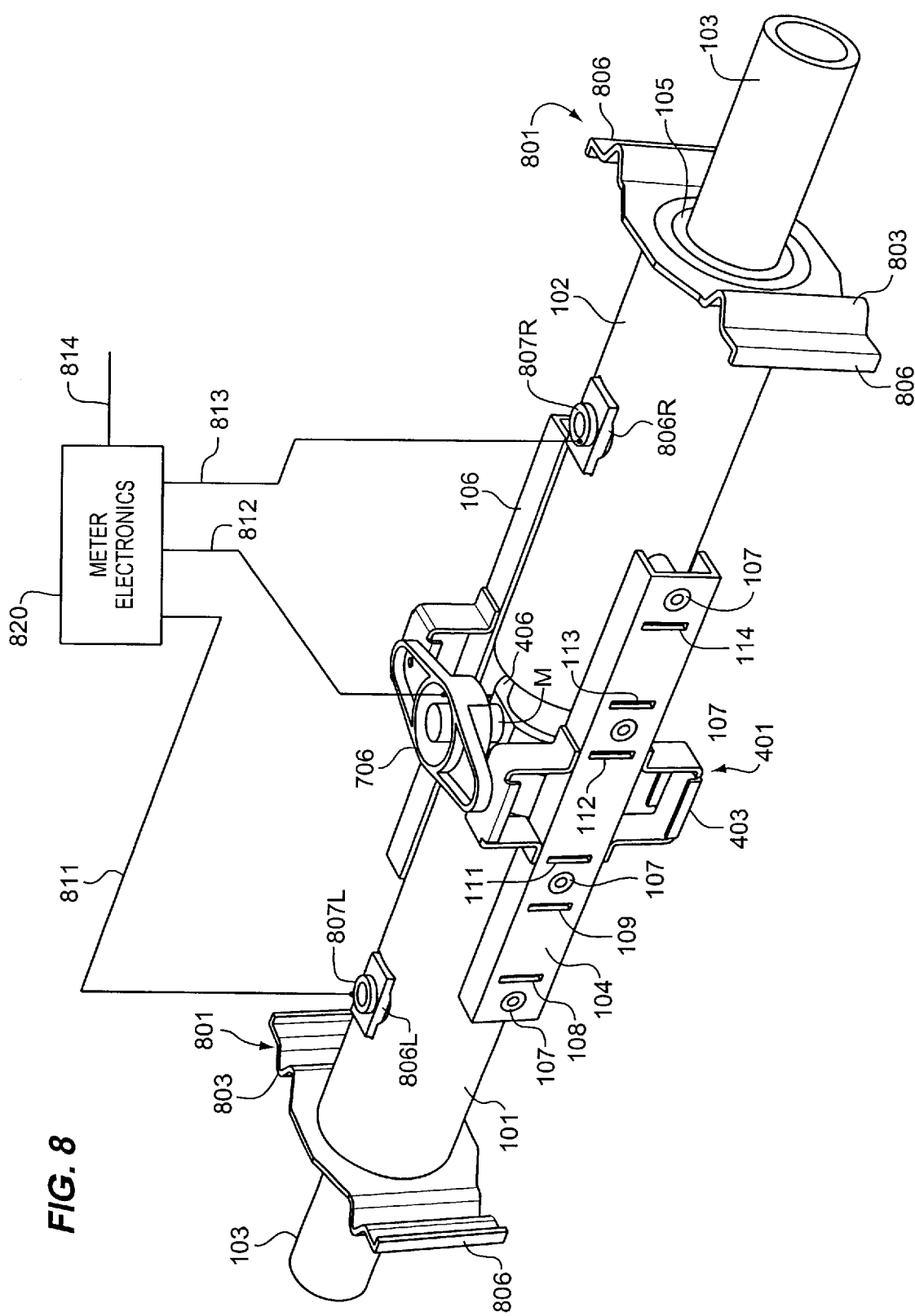
FIG. 8 discloses details of a Coriolis flowmeter structure in accordance with the present invention.

Rings 407L and 407R are used to affix pickoffs (velocity sensors) to the flow tube and balance bar halves as shown in better detail on FIG. 8. Element 403 includes a weight (not shown) that balances the weight of the driver assembly D. This balance is necessary to provide symmetry and a dynamic balance to drive bracket 401 and driver D.

Figure 5:
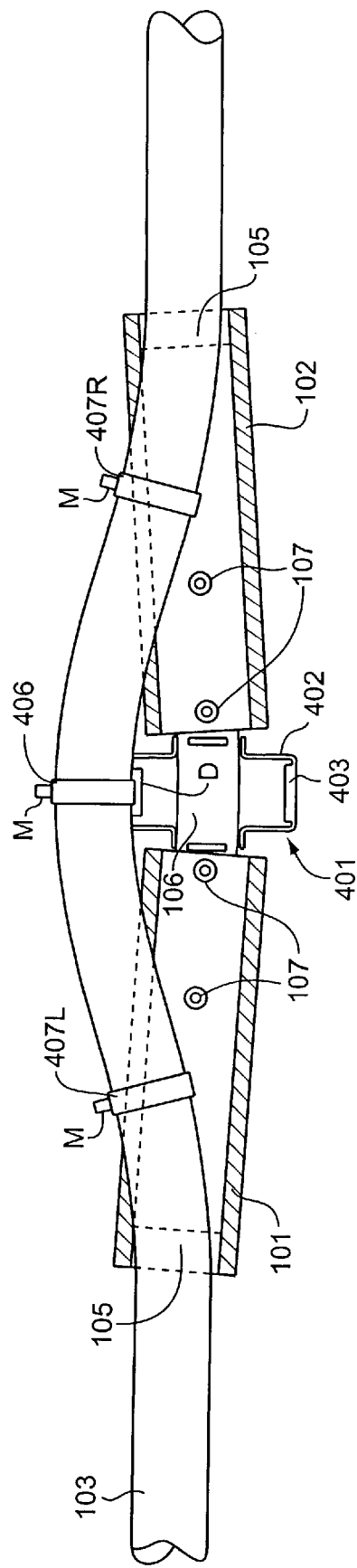

Description of FIG. 5

The elements of FIG. 5 are similar in most respects to those of FIG. 4. FIG. 5 shows balance bar halves 101 and 102 and the exaggerated deflection of flow tube 103. The difference between FIGS. 4 and 5 is that FIG. 5 shows the front half of balance bar halves 101 and 102 removed. It also does not show the front side channel 104 shown on FIG. 1 and FIG. 4. This enables the details of the rear half of the balance bar halves 101 and 102 to be shown in greater detail as well as detail of rear side channel 106. FIG. 5 also shows the vibrational patterns of flow tube 103 as well as balance bar halves 101, 102 and side channels 106 in exaggerated form.

Figure 6:
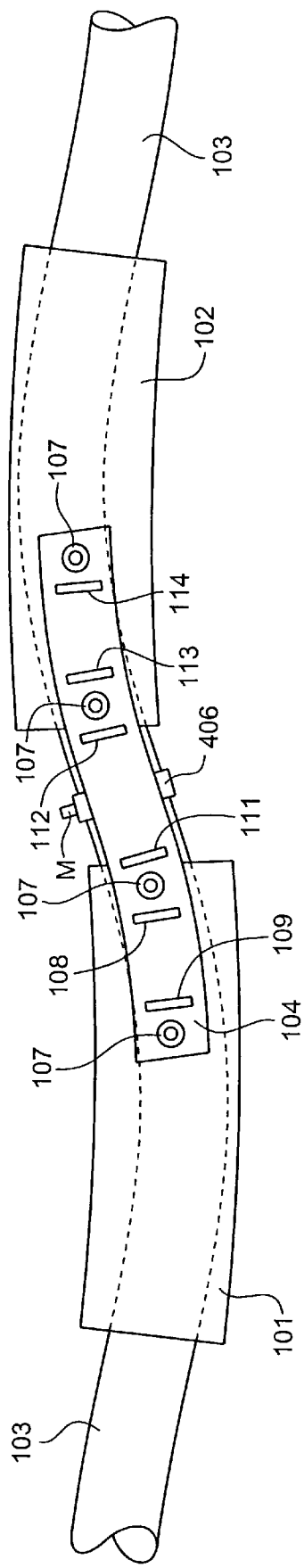

Description of FIG. 6

FIG. 6 discloses the Coriolis response of the structure of FIGS. 4 and 5. It depicts the instant when the drive mode deflection is passing through zero and the Coriolis based deflection is at its maximum. The Coriolis deflection results from the fluid flowing through the vibrating tube. The pickoff apparatus, the brackets and drivers are not shown on FIG. 6 to minimize drawing complexity and to facilitate an understanding of the Coriolis deflection of the indicated elements.

Figure 7:
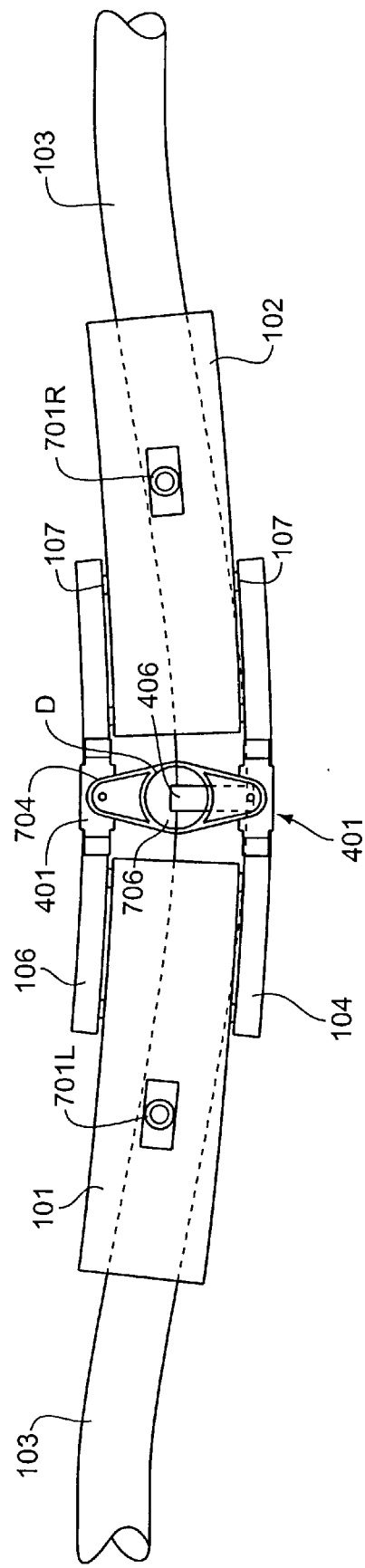

Description of FIG. 7

FIG. 7 discloses the deflected shape of the flowmeter structure of FIG. 2 in the undesired lateral vibration mode. FIG. 7 discloses structure of FIG. 2 when equipped with pickoffs 701L and 701R as well as the driver structure D which includes the drive bracket elements 401. The side channels are stiffer in bending in the drive direction than the lateral direction. The lower stiffness in the lateral vibration mode lowers the resonant frequency in that mode and improves the frequency separation between the drive frequency and the undesired lateral frequency. The result is improved flowmeter stability.

Description of FIG. 8

FIG. 8 discloses the flowmeter structure shown in the preceding drawing FIGS. as embodied into a flowmeter that is complete except for a case. The flowmeter of FIG. 8 includes flow tube 103 and connecting ring 105 within balance bar halves 101 and 102. The balance bar halves are interconnected with side rails 104 and 106. Additionally shown on FIG. 8 are pegs 107 and further details of driver D which includes a coil 706 associated with the balance bar halves. Driver D further includes a magnet M positioned on the top surface of ring 406 which is affixed to the center portion of the flow tube to provide a mounting surface for magnet M. Side rails 104 and 106 and driver bracket 401 are comparable to those shown on previous drawing figures. Pickoffs 806L and 806R include coils 807L and 807R which are vibrationally associated with balance bar halves 101 and 102, respectively. The pickoffs further each include a magnet, not shown, which is affixed to the portion of the flow tube wall beneath the pickoffs. Elements 801 are case connect links that have outer edges 806 which are adapted to engage the inner surface of a case (not shown) as well as contours 803 which permit a case connect link to change in length due to changing thermal conditions without exerting stress on the flow tube 103. The axial ends of the flow tube 103 are adapted to be connected by process connections (not shown) to a pipeline or other flow system having a material flow whose characteristics are to be determined by the flowmeter.

FIG. 8 also discloses meter electronics 800 which applies a signal over path 812 to cause driver D to vibrate the flow tube and balance bar halves in phase opposition. Pickoffs 806L and 806R detect the Coriolis deflections induced in the vibrating flow tube with material flow and extend these signals over paths 811 and 813 to meter electronics which derives information indicative of the material flow. This information is applied over 814 to a utilization circuit not shown.

It is expressly understood that the claimed invention is not to be limited to the description of the preferred embodiment but encompasses other modifications and alterations within the scope and spirit of the inventive concept.

For example, this specification discloses a brazing operation to connect the balance bar halves to the flow tube wall via a connecting ring as well as the bonding of the pegs to openings in the balance bar halves. This description also describes the bonding of the pegs to holes in the side channels by means of a process that generates circular welds. It is to be understood that other bonding and attachment techniques may be used in accordance with the spirit of the invention. Also, it is described herein that the pegs are tubular elements having a hollow center core. If desired, the pegs could be solid and they need not be circular. They could be square, triangular or irregular in accordance with the spirit of the invention.

What is claimed:

1. A Coriolis flow meter adapted to be connected to a system having a material flow, said Coriolis flow meter having a balance bar and a flow tube adapted to be vibrated in a drive plane in phase opposition to generate Coriolis deflections of said vibrating flow tube with material flow; pickoff means that detect said Coriolis deflections to generate signals representing information pertaining to said material flow; said balance bar is coaxial with said flow tube and surrounds a portion of said flow tube, said Coriolis flow meter further comprises:

connecting rings;

separate halves of said balance bar each being coaxial with said flow tube and with each half having an axial outer end connected to a surface of said flow tube by one of said connecting rings;

elongated apparatus that interconnects the inner axial ends of said balance bar halves, said elongated apparatus is located on the neutral plane of the drive mode of said balance bar and is spaced apart from the outer radial surface of said balance bar halves;

said elongated apparatus and said balance bar halves vibrate in said drive plane as an integral structure.

2. The Coriolis flow meter of claim 1 characterized in that said elongated apparatus comprises:

a plurality of elongated elements each spaced apart from the outer radial surface of said balance bar halves and oriented parallel to the longitudinal axis of said balance bar halves.

3. The Coriolis flow meter of claim 2 characterized in that said elongated elements define side channels that are-u-shaped in a cross section perpendicular to their longitudinal axes.

4. The Coriolis flow meter of claim 2 characterized in that said elongated elements define side channels that are non-U-shaped in cross section.

5. The Coriolis flow meter of claim 2 having pegs connecting said elongated elements to said balance bar halves;

said pegs, said elongated elements and said balance bar halves vibrate in said drive mode as an integral element.

6. The Coriolis flow meter of claim 5 having holes in said elongated elements and in said balance bar halves for fixably receiving said pegs.

7. The Coriolis flow meter of claim 6 characterized in that said pegs are bonded at a first end to said holes in said balance bar halves and welded at a second end to said holes in said elongated elements.

8. The Coriolis flow meter of claim 6 characterized in that said pegs are tubular with a hollow center core.

9. The Coriolis flow meter of claim 6 characterized in that said pegs are circular in cross section.

10. The Coriolis flow meter of claim 6 characterized in that said pegs have an non circular cross section.

11. The Coriolis flow meter of claim 6 characterized in that there is at least one peg connecting each elongated element with each of said balance bar halves.

12. The Coriolis flow meter of claim 6 characterized in that there are at least two pegs connecting each elongated element with each of said balance bar halves.

13. The Coriolis flow meter of claim 6 characterized in that said pegs are tubular with each peg each having a first end bonded to one of said balance bar halves and a second end welded to one of said elongated elements.

14. The Coriolis flow meter of claim 5 characterized in that said elongated elements have slots oriented transversely to a longitudinal axis of said elongated elements, said slots limit axial shrink of said elongated elements due to the welding of said pegs to said elongated elements.

15. The Coriolis flow meter of claim 2 characterized in that said Coriolis flow meter has two elongated elements oriented longitudinally on opposite sides of said balance bar.

16. The Coriolis flow meter of claim 13 characterized in that the geometry of said weld defines an endless closed loop.

17. The Coriolis flow meter of claim 13 characterized in that the geometry of said weld defines a circular pattern.

* * * * *